(12) United States Patent
Clements

(10) Patent No.: US 7,610,760 B2
(45) Date of Patent: Nov. 3, 2009

(54) TWO-DISPLACEMENT SETTING VARIABLE DISPLACEMENT PUMP USED AS ENGINE OVER-THRUST PROTECTION WITH FUEL SYSTEM THERMAL BENEFIT

(75) Inventor: Martin A. Clements, North Royalton, OH (US)

(73) Assignee: Argo-Tech Corporation, Cleveland, OH (US)

( * ) Notice: Subject to any disclaimer, the term of this patent is extended or adjusted under 35 U.S.C. 154(b) by 478 days.

(21) Appl. No.: 10/592,724

(22) PCT Filed: Mar. 29, 2005

(86) PCT No.: PCT/US2005/010364

§ 371 (c)(1),
(2), (4) Date: Sep. 14, 2006

(87) PCT Pub. No.: WO2005/104678

PCT Pub. Date: Nov. 10, 2005

(65) Prior Publication Data

US 2008/0229726 A1    Sep. 25, 2008

Related U.S. Application Data

(60) Provisional application No. 60/557,429, filed on Mar. 29, 2004.

(51) Int. Cl.
*F02C 9/30* (2006.01)
(52) U.S. Cl. .................... 60/773; 60/39.281; 60/779
(58) Field of Classification Search ............. 60/39.091, 60/39.281, 243, 734, 773, 779
See application file for complete search history.

(56) References Cited

U.S. PATENT DOCUMENTS

| | | | |
|---|---|---|---|
| 5,715,674 A | 2/1998 | Reuter et al. | |
| 5,806,300 A | 9/1998 | Veilleux, Jr. et al. | |
| 6,487,847 B1 | 12/2002 | Snow et al. | |
| 6,526,743 B2 | 3/2003 | Maker et al. | |
| 6,962,485 B2 * | 11/2005 | Bennett et al. | 417/213 |
| 2005/0100447 A1 * | 5/2005 | Desai et al. | 417/220 |

\* cited by examiner

*Primary Examiner*—Louis J Casaregola
(74) *Attorney, Agent, or Firm*—Fay Sharpe LLP

(57) ABSTRACT

A fuel delivery system (10) comprises a variable displacement pump (20) for pressurizing fuel. The variable displacement pump has a distinct first pump displacement setting for a first desired mass flow of fuel and a distinct second pump displacement setting for a second desired mass flow of fuel. The variable displacement pump operates in only one of the first and second pump displacement settings. A fuel control (22) with a metering valve downstream of the variable displacement pump selectively regulates fuel delivery.

19 Claims, 4 Drawing Sheets

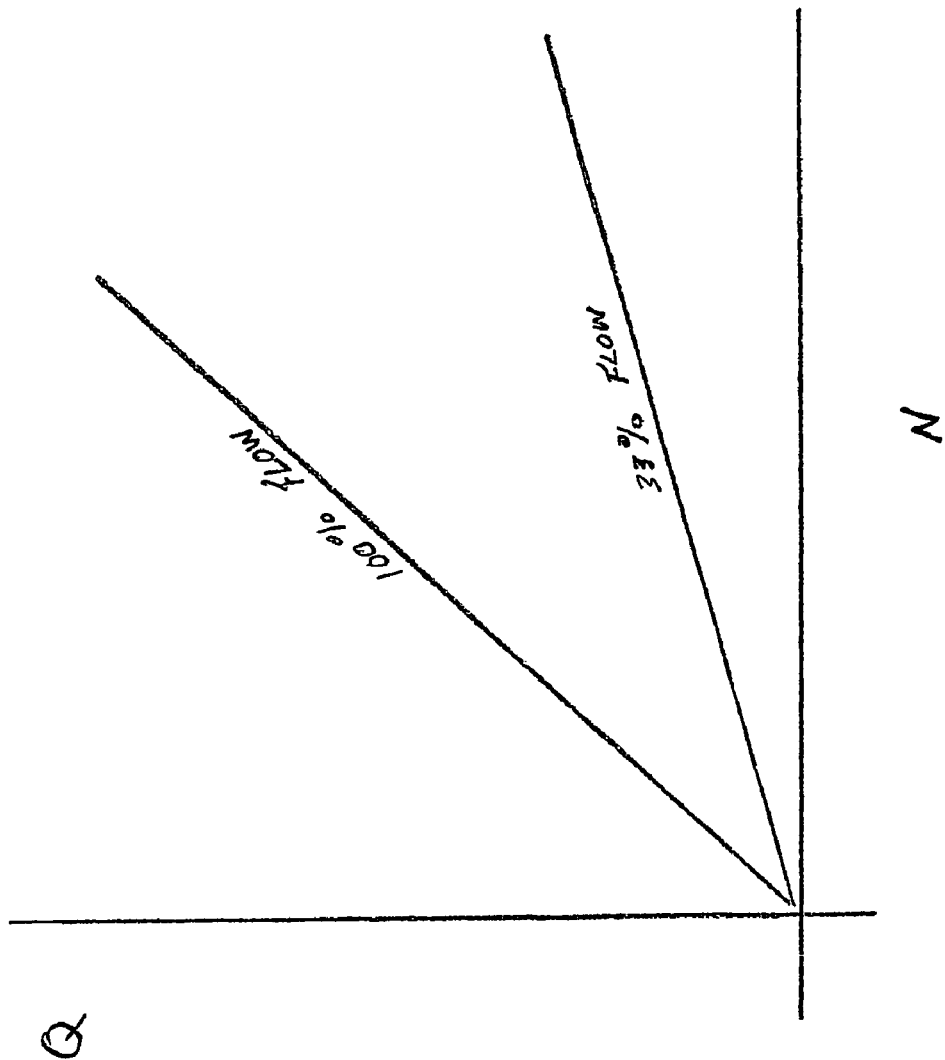

TWO-DISPLACEMENT SETTING VARIABLE DISPLACEMENT PUMP USED AS ENGINE OVER-THRUST PROTECTION WITH FUEL SYSTEM THERMAL BENEFIT

CROSS REFERENCE TO RELATED APPLICATIONS

This application claims priority from U.S. Provisional Patent Application Ser. No. 60/557,429 filed Mar. 29, 2004 and is a 35 U.S.C. 371 filing of International Application No. PCT/US2005/010364, international filing date 29 Mar. 2005, both applications being incorporated herein by reference.

BACKGROUND OF THE INVENTION

The present invention relates to a fuel delivery system. It finds particular application in conjunction with modern jet aircraft turbine engines, finding particular application during a control system failure, and will be described with particular reference thereto. However, it is to be appreciated that the present exemplary embodiment is also amenable to other applications.

Known fuel delivery systems have proven effective to date to provide desired fuel flow in a wide array of circumstances. Modern jet aircraft engines are now required to prevent even rare occurrences of uncontrolled engine over-thrust during control system failures. Cases of gross over-thrusting engines have resulted in several instances of loss of aircraft control due to substantial asymmetric thrust. As such, the Federal Aviation Administration (FAA) is considering new airworthiness regulations that dictate control system design that will prevent engine over-thrust conditions.

Engine over-thrust conditions are generally caused by a major loss of control functions that result in full fuel pump flow being delivered to an engine combustor. Many schemes are being considered that will bypass the pump delivered flow away from the engine combustor as to control flow delivered to the combustor, and thus engine thrust. These systems require additional hardware features that are independent of the normal control means.

In addition, as jet aircraft engines become more fuel efficient, modern engines have an ever increasingly difficult task of managing fuel system heat. Reduced windmill speeds add to the heat management task by forcing the engine fuel pump to be of a larger capacity, and therefore generate a larger quantity of heat to be dissipated.

Accordingly, there is a need for an improved fuel delivery system which provides over-thrust protection with improved fuel system thermal benefit.

BRIEF DESCRIPTION OF THE INVENTION

A new and improved fuel delivery system for a jet aircraft turbine engine is provided.

According to one aspect of the invention, the fuel delivery system comprises a system that has only two distinct pump displacement settings. The fuel delivery system preferably employs a variable displacement pump for pressurizing fuel. The variable displacement pump has a distinct first pump displacement setting for a first desired mass flow of fuel and a distinct second pump displacement setting for a second desired mass flow of fuel. The variable displacement pump operates in only one of the first and second pump displacement settings. A metering valve downstream of the variable displacement pump selectively regulates fuel delivery.

In the first position, the variable displacement pump is positioned to deliver a first predetermined, high mass flow, fuel displacement setting as would be required for a large amount of flow such as starting and takeoff. The pump is operative in a second predetermined, low mass flow, fuel displacement setting where reduced flow requirements are needed such as high altitude cruising or descent. A metering valve downstream of the variable displacement pump selectively regulates fuel delivery. A controller selectively positions the pump in only one of the first and second fuel displacement settings. Positioning the pump to operate in the second fuel displacement setting in the event of failure of the controller prevents engine over-thrust. The two-displacement pumping scheme provides a means of preventing engine over-thrust where in the event of major control system failure, the pump is positioned in the second of low flow displacement setting so that the pump will not produce an amount of flow that will enable the engine to accelerate to full power.

According to yet another aspect of the invention, a method of delivering fuel for an associated jet aircraft turbine engine is provided. Fuel is pressurized with a variable displacement pump. The pump has first and second fixed displacement settings for first and second predetermined mass flows of fuel and is set to only one of the first and second displacement settings. The fuel is metered through a metering valve for supply to fuel nozzles of the engine.

A benefit of the present invention is the ability to prevent engine over-thrust through the use of a variable displacement pump.

Another benefit of the present invention is the ability to minimize pump heating during a low flow displacement setting since the pump will contribute less heat to the fuel system, and permit fuel system heating to avoid fuel system icing at cold operating conditions by commanding the pump to its high flow displacement setting under substantially all conditions, regardless of system flow needs.

Still other benefits and aspects of the invention will become apparent from a reading and understanding of the detailed description of the preferred embodiments hereinbelow.

BRIEF DESCRIPTION OF THE DRAWINGS

The present invention may take physical form in certain parts and arrangements of parts, preferred embodiments of which will be described in detail in this specification and illustrated in the accompanying drawings which form a part of the invention.

FIG. 4 is a graphical representation of speed versus fuel flow of the variable displacement pump operative in either the first or second displacement settings.

DETAILED DESCRIPTION OF THE INVENTION

It should, of course, be understood that the description and drawings herein are merely illustrative and that various modifications and changes can be made in the structures disclosed without departing from the spirit of the invention. Like numerals refer to like parts throughout the several views.

Figure 1:
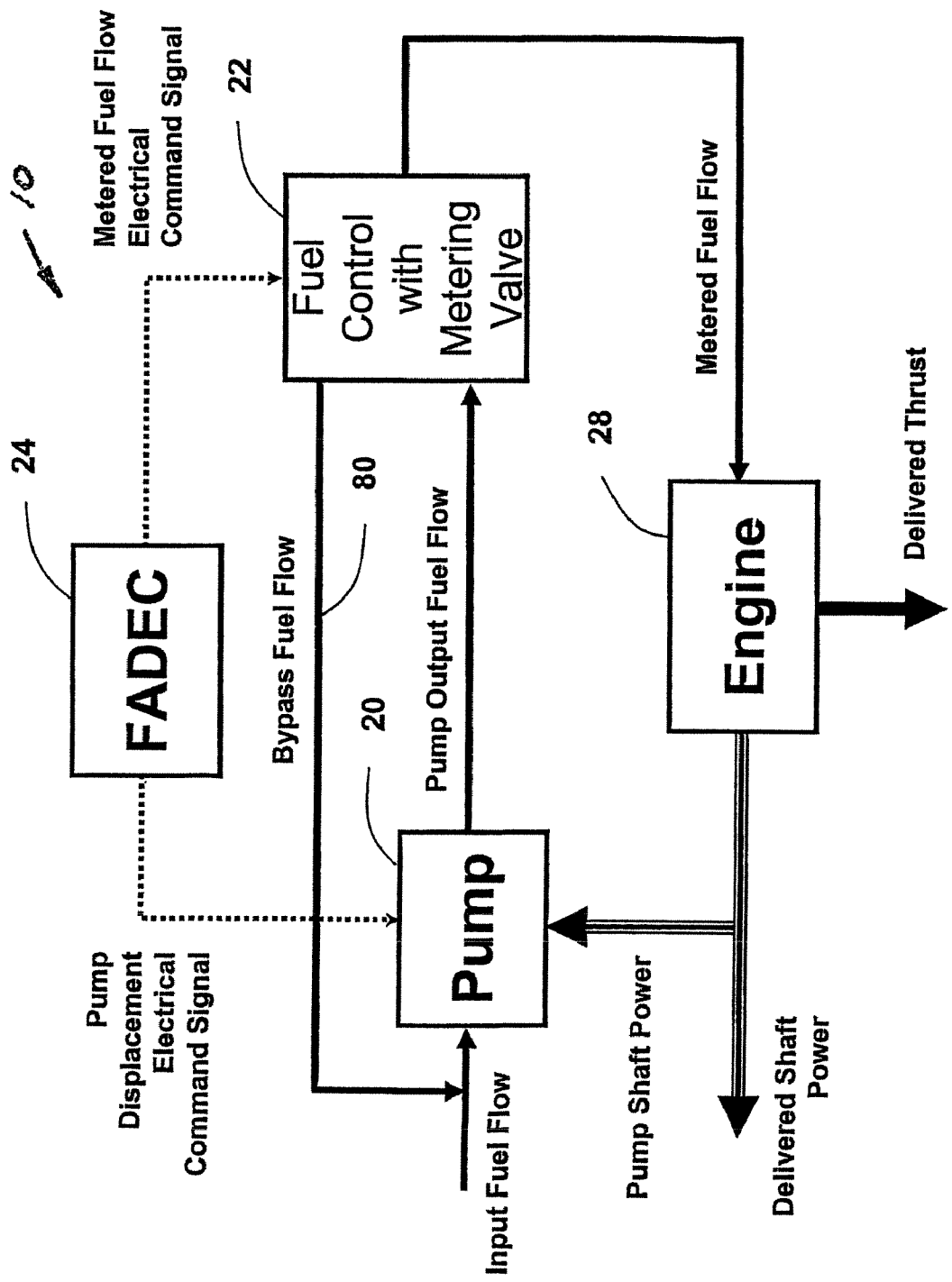
FIG. 1 is a simplified schematic of the fuel delivery system according to one embodiment of the present invention.
Figure 2:
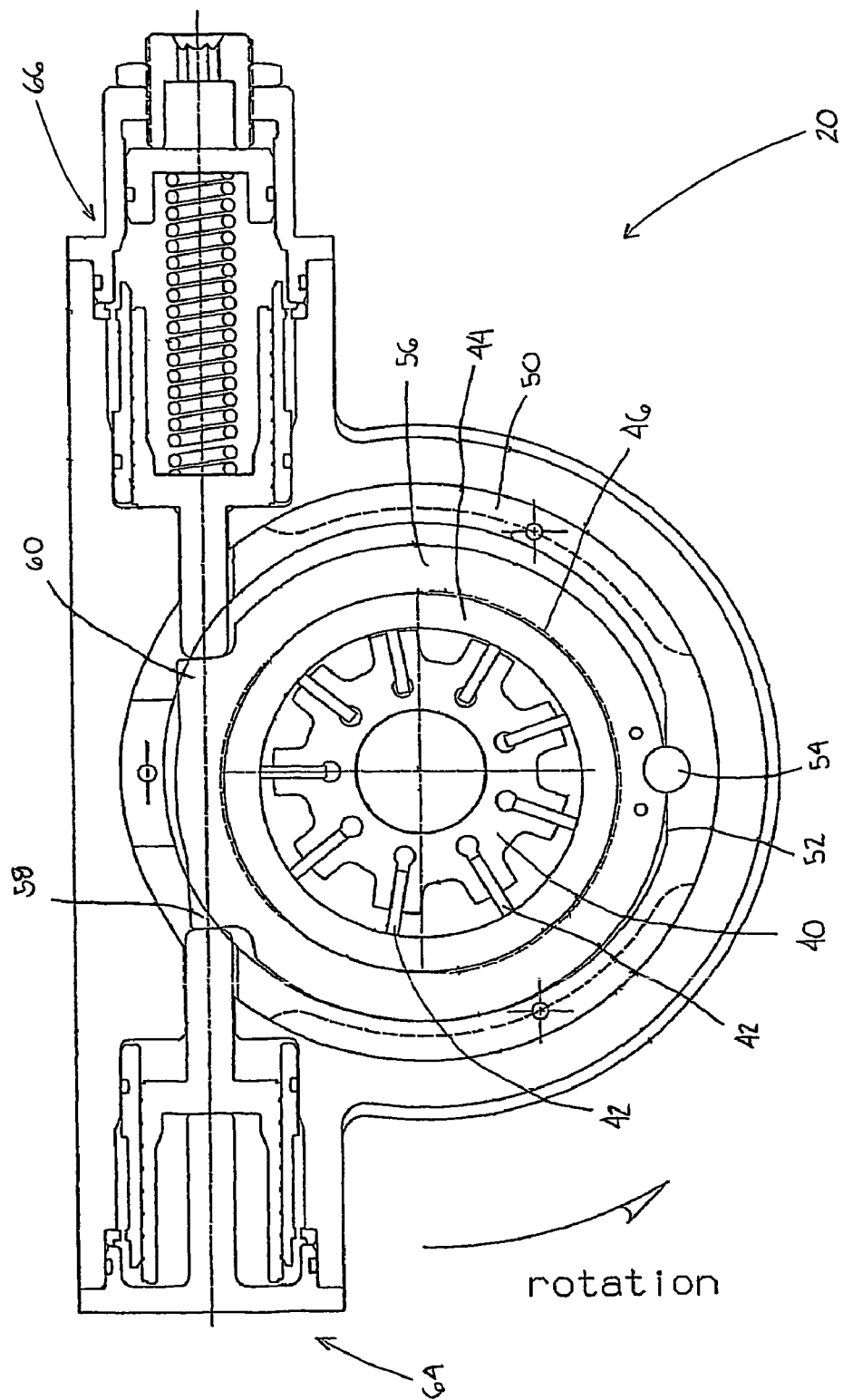
FIG. 2 is a cross-sectional view of a preferred variable flow pump in a first displacement setting used in the fuel delivery system of FIG. 1.
Figure 3:
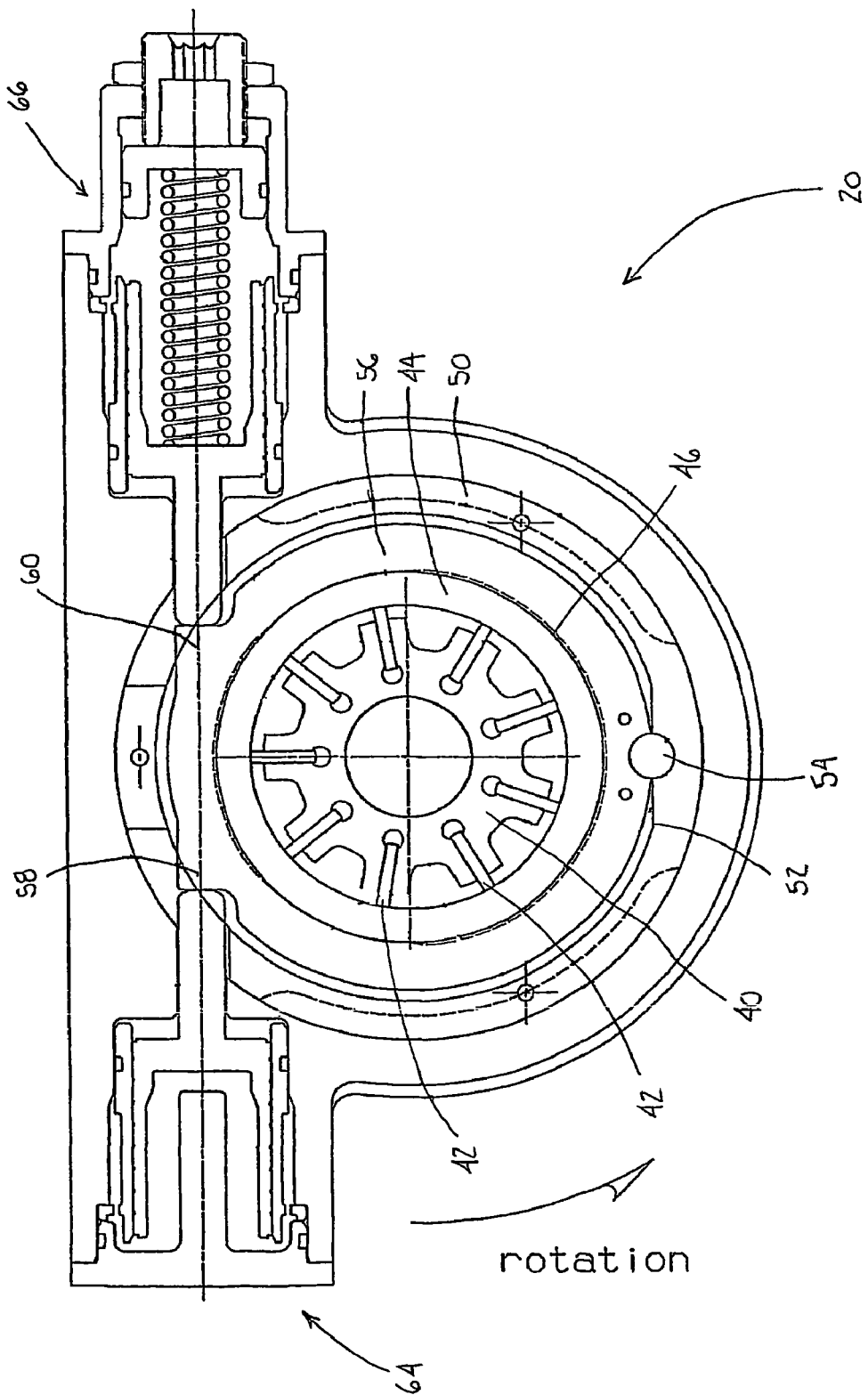
FIG. 3 is a cross-sectional view of the variable flow pump in a second displacement setting.

As schematically illustrated in FIG. 1, a fuel delivery system 10 of the present invention includes a high pressure variable displacement pump 20, a fuel control 22, a controller 24 and an engine such as a jet aircraft turbine engine 28. Generally, fuel is inlet to a centrifugal boost stage (not shown), initially pressurized and passed through a fuel/oil heat exchanger (not shown) and a filter (not shown) before being input to the pump 20. As shown in FIGS. 2 and 3, and also described in greater detail in co-pending U.S. patent application Ser. No. 10/474,225 (publication 20040136853), filed Oct. 3, 2003 based on PCT/US02/09298, filed Mar. 27, 2002, the preferred, variable displacement pump 20 includes a rotor 40, which has multiple vanes 42 extending there from. A cam ring 44 surrounding the rotor and vanes is free to rotate relative to the vanes 42. Thus, substantial losses between the outer tips of the vanes and a stationary cam ring as used in a typical vane pump are not encountered with the present invention. The cam ring 44 is supported in a continuous fluid bearing 46 defined by the pumped fuel. A spacer ring 50 is received around the rotor 40. The spacer ring has a flat or planar cam rolling surface 52 and receives a pin 54. The pin cooperates with a cam sleeve 56 that is received around the rotor 40 to reposition the rotor and vanes to desired pumping positions.

First and second lobes or actuating surfaces 58, 60 are provided on the sleeve 56, typically at a location opposite the pin. The lobes cooperate with first and second actuator assemblies 64, 66 to define means for altering a position of the cam sleeve 56. The altering means selectively alter the stroke or displacement of the pump in a manner well known in the art. This variable displacement pump is preferred, although it will be understood that still other pumps may be used without departing from the scope and intent of the present invention.

In accordance with the present invention, the variable displacement pump 20 has a distinct, predetermined first pump displacement setting for a first desired mass flow of fuel (FIG. 2) and a distinct, predetermined second pump displacement setting for a second desired mass flow of fuel (FIG. 3). In use, the pump 20 operates in only one of the first and second pump displacement settings, the first pump displacement setting being a high mass flow displacement setting and the second pump displacement setting being a low mass flow displacement setting.

With reference to FIG. 2, the actuating assemblies 64, 66 are actuated so that the cam sleeve 56 is positioned to vary the stroke of the pump 20. That is, the cam sleeve 56 is positioned so that a close clearance is defined between the cam sleeve and the spacer ring 50 along the left-hand quadrants of the pump as illustrated in FIG. 2. In this position, the pump 20 is fixed in its first displacement setting, the high mass flow displacement setting. This flow setting is selected while operational (i.e., does not have to be set while inoperative) so that sufficient fuel flow is provided to the system where large flows are required during operation such as starting and take-off.

With reference to FIG. 3, the positions of the actuating assemblies 64, 66 are altered when compared to FIG. 2. The cam sleeve 56 is moved to vary the stroke of the vane pump to a second displacement setting, or the low mass flow displacement setting. This position is used during low flow conditions such as high altitude cruising or descent where flow requirements are reduced.

Thus, as shown in FIGS. 2 and 3, the pump 20 includes a distinct first stop and a distinct second stop, the first and second stops defining first and second positions of pump stroke travel. The first and second positions of pump stroke travel, in turn, define the respective first and second displacement settings (i.e. the operational parameters for pump stroke travel). These are the only two steady, commanded operational positions of the pump in accordance with the present invention. The pump either operates in a first or low flow condition or in a second or high flow position. It is recognized that the pump with transition through intermediate positions between the first and second displacement settings, however, the actuators and the pump control are operative so that the pump is commanded or directed to operate in these one of the two distinct positions only. That is, if the pump is at the first displacement position and commanded to the second displacement position, the pump proceeds to the second position without stopping and operating steadily at any intermediate position.

The pump 20 delivers a controllable amount of fuel flow in response to control signals. As shown in FIG. 1, the output flow from the pump travels in a flow path through the fuel control 22 that includes a metering valve (not shown) where the fuel is directed to the turbine engine 28 and combusted to produce power. The fuel control 22 is downstream of the pump 20 for selectively regulating fuel delivery to the engine. A bypass 80 is provided at the fuel control 22 for returning bypass flow to the pump inlet. Bypass flow is the remaining portion of the variable displacement pump 20 output flow that is not used for combustion purposes. The bypass flow is generally returned through a bypass valve (not shown) to the inlet of the pump 20 after passing through another fuel/oil heat exchanger (not shown). In this system, metered flow is established by adjusting the position of the metering valve of the fuel control 22 to obtain the desired mass flow. The metering valve position of the fuel control 22 is set by the controller 24.

As noted above, prior art fuel control systems have been inadequate in controlling engine speed in the event of a control system failure. For example, incorporating a hydro-mechanical overspeed governor function to limit engine speed has been used as one solution in the event of a control system failure that would otherwise cause the engine to be uncontrollable. However, typical incorporation of the overspeed governor uses features of the fuel control which are responsible for normal flow regulation and may in fact be the cause for such an uncontrollable event. The present system of FIG. 1 uses the variable displacement pump 20 to reduce the maximum flow and thereby limit delivered metered fuel flow to the engine 28 and thus prevent the occurrence of a gross overthrust situation.

With continued reference to FIG. 1, the controller 24 positions the pump 20 in one of the first pump displacement setting (FIG. 2) and the second pump displacement setting (FIG. 3). The controller 24 can be a solenoid valve, for example, which is responsive to an electronic control signal for actuating the pump 20 to only one of the first and second pump displacement settings. Thus, the solenoid valve is commanded by the controller 24 and positions the pump 20 to one of its first and second modes of operation. In the event of a control system failure that would otherwise cause the engine 28 to over-thrust, the controller 24 positions the pump 20 to operate in the second fuel displacement setting whereby pump flow to the engine is limited.

In operation, fuel is pressurized through the pump 20 that has first and second fixed displacement settings for first and second predetermined mass flows of fuel. The fuel is metered through a fuel control 22 having a metering valve for supply to fuel nozzles of the engine 28. The pump 20 is set to only one of the first and second displacement settings (FIGS. 2 and 3).

With the above operation, fuel system temperature is advantageously controlled by operating the variable displacement pump 20 in either its fixed high mass flow displacement setting (and avoiding fuel system icing in cold operating conditions) or fixed low mass flow displacement setting (and thereby reducing excess heat). Fuel exiting the fuel control 22 is bypassed to recirculate a portion of fuel to the pump 20.

In summary, the present system uses the variable displacement pump 20 with physical stops of pump stroke travel, thereby setting two distinct pump displacement settings. Under normal conditions requiring a large amount of pumped flow (such as starting and takeoff), the pump 20 is stroked to the high flow displacement setting (FIG. 2) to provide the complete range of required engine operation. As flow requirements reduce (at conditions such as high altitude cruise or descent), the pump 20 is placed to its low flow displacement setting (FIG. 1). With the low flow displacement setting, the pump 20 contributes less heat to the fuel system. A control means such as a solenoid valve commanded by the controller 24 positions the pump 20 to each displacement setting.

In addition to minimizing pump heating, the proposed system configuration permits fuel system heating to avoid fuel system icing at cold operating conditions. Fuel system heating is accomplished by commanding the pump 20 to its high flow displacement setting under all conditions, regardless of system flow needs.

In addition to providing benefit to the thermal management aspect of the engine, the two-displacement pumping scheme of the pump 20 provides a means of preventing engine over-thrust. In the event of major control system failure that results in full pump flow being delivered to the engine 28, the pump 20 would be set to the low flow displacement setting. At this low flow setting, the pump 20 will not produce an amount of flow that will enable the engine 28 to accelerate to full power. Engine speed (and thus thrust level) will equilibrate at a level depending on the displacement chosen for the low flow setting. In this way, engine over-thrust protection is provided without adding control hardware to the fuel delivery system.

It will be appreciated that other types of pumps may be used, namely any type of pump that could be set up into two displacement modes. It could even be a two stage gear pump, one of which bypasses flow directly and the other stage doing the pumping. However, the illustrated and described variable pump is preferred.

Moreover, although other solutions have been considered, these alternative solutions add additional components to the system, thereby adding to the cost, complexity, and/or the potential that other components could fail.

In one example as shown in FIG. 4, the first position is 100% flow capacity while the second position is approximately 33% of the pump flow capacity. However, these values are illustrative only and are not to be construed as requirements to achieve the benefits and advantages described above.

The present invention has been described with reference to the preferred embodiment. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A fuel delivery system for an associated jet aircraft turbine engine during a control system failure comprising:
   a pump for pressurizing fuel, the pump having a distinct first pump displacement setting for a first desired mass flow of fuel and a distinct second pump displacement setting for a second desired mass flow of fuel, wherein the pump operates in only one of the first and second pump displacement settings;
   a metering valve downstream of the pump for selectively regulating fuel delivery; and,
   means for preventing engine over-thrust operatively associated with the pump for positioning the pump in the second pump displacement setting in response to a control system failure whereby pump flow to the associated engine is limited to provide over-thrust protection.

2. The fuel delivery system of claim 1 wherein the first pump displacement setting is a high mass flow displacement setting.

3. The fuel delivery system of claim 1 wherein the second pump displacement setting is a low mass flow displacement setting.

4. The fuel delivery system of claim 3 wherein the pump is activated to the second pump displacement setting in response to a control system failure.

5. A fuel delivery system for an associated jet aircraft turbine engine during a control system failure comprising:
   a pump for pressurizing fuel, the pump having a distinct first pump displacement setting for a first desired high mass flow of fuel and a distinct second pump displacement setting for a second desired low mass flow of fuel, wherein the pump operates in only one of the first and second pump displacement settings, wherein the pump is activated to the second pump displacement setting in response to a control system failure;
   a metering valve downstream of the pump for selectively regulating fuel delivery; and,
   a controller for preventing engine over-thrust operatively associated with the pump for positioning the pump in the second pump displacement setting in response to a control system failure whereby pump flow to the associated engine is limited to provide over-thrust protection.

6. The fuel delivery system of claim 1 wherein the pump includes distinct first and second stops defining operational parameters for pump stroke travel.

7. The fuel delivery system of claim 1 further comprising a controller for positioning the pump in one of the first and second pump displacement settings.

8. The fuel delivery system of claim 5 or 7 wherein the controller is a solenoid valve responsive to an electronic control signal for actuating the pump to only one of the first and second pump displacement settings.

9. The fuel delivery system of claim 1 further comprising a bypass passage downstream of the pump for returning excess flow to a pump inlet.

10. The fuel delivery system of claim 1 further comprising a solenoid valve, the solenoid valve being commanded by the electronic control for positioning the pump to one of the first and second modes of operation.

11. The fuel delivery system of claim 1 wherein the second pump displacement setting contributes less heat to the fuel system.

12. The fuel delivery system of claim 1 wherein the first pump displacement setting permits fuel system heating for avoiding fuel system icing at cold operating conditions.

13. The fuel delivery system of claim 1 wherein the pump is a variable displacement pump.

14. A method of delivering fuel for an associated jet aircraft turbine engine comprising the steps of:
   pressurizing fuel through a pump having first and second fixed displacement settings for a first predetermined, high mass flow of fuel and a second predetermined, low mass flows of fuel;
   metering the fuel through a metering valve for supply to associated fuel nozzles;

setting the pump to only one of the first and second displacement settings; and, positioning the pump in the second pump displacement setting in response to a control system failure whereby pump flow to the associated engine is limited to provide over-thrust protection.

15. The method of claim 14 comprising the further step of controlling fuel system temperature by operating the pump in its fixed high mass flow displacement setting.

16. The method of claim 14 comprising the further step of bypassing fuel exiting the metering valve to recirculate a portion of fuel to the pump.

17. A fuel delivery system for preventing engine over-thrust for an associated jet aircraft turbine engine comprising:

a variable displacement pump for pressurizing fuel operative in either a first predetermined, high mass flow, fuel displacement setting or a second predetermined, low mass flow, fuel displacement setting;

a metering valve downstream of the variable displacement pump for selectively regulating fuel delivery; and, a controller for selectively positioning the pump in only one of the first and second fuel displacement settings, and positioning the pump to operate in the second fuel displacement setting in the event of failure of the controller thereby preventing engine over-thrust.

18. The fuel delivery system of claim 17 wherein the pump includes first and second stops in first and second extremes of pump stroke travel.

19. The fuel delivery system of claim 18 wherein the first and second extremes of pump stroke travel define the respective first and second displacement setting.

* * * * *